US011349916B2

(12) United States Patent
Hrebicek et al.

(10) Patent No.: US 11,349,916 B2
(45) Date of Patent: *May 31, 2022

(54) LEARNING CLIENT PREFERENCES TO OPTIMIZE EVENT-BASED SYNCHRONIZATION

(71) Applicant: EMC IP Holding Company LLC, Hopkinton, MA (US)

(72) Inventors: Ondrej Hrebicek, San Carlos, CA (US); Srin Kumar, Sunnyvale, CA (US); Hironmay Basu, Mountain View, CA (US); Ashwani Verma, Pleasanton, CA (US); Andrew Rondeau, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,343

(22) Filed: May 28, 2020

(65) Prior Publication Data

US 2020/0296161 A1 Sep. 17, 2020

Related U.S. Application Data

(63) Continuation of application No. 14/743,339, filed on Jun. 18, 2015, now Pat. No. 10,721,298.

(51) Int. Cl.
*H04L 67/1095* (2022.01)
*H04L 67/1097* (2022.01)

(52) U.S. Cl.
CPC ...... *H04L 67/1095* (2013.01); *H04L 67/1097* (2013.01)

(58) Field of Classification Search
None
See application file for complete search history.

(56) References Cited

U.S. PATENT DOCUMENTS

| 7,024,491 | B1 * | 4/2006 | Hanmann | G06F 16/9574 709/248 |
| 8,650,498 | B1 * | 2/2014 | Mihovilovic | H04L 41/22 715/763 |
| 8,825,597 | B1 | 9/2014 | Houston | |
| 2003/0046415 | A1 | 3/2003 | Kaijyu | |

(Continued)

OTHER PUBLICATIONS

EMC Corporation—White Paper. "Secure, Enterprise File Sync and Share with EMC Syncplicity Utilizing EMC Isilon, EMC Atmos, and EMC VNX". Aug. 2014.

*Primary Examiner* — Younes Naji
(74) *Attorney, Agent, or Firm* — Krishnendu Gupta; Nikhil Patel

(57) ABSTRACT

Techniques to perform event-based synchronization of data among a plurality of endpoints are disclosed. In various embodiments, a user interaction associated with synchronization set data that has been synchronized based on synchronization events downloaded from a synchronization server configured to propagate changes via a synchronization event stream is observed. The observed user interaction is used to infer a user preference with respect to downloaded synchronization set data. Access is provided to synchronization event related data in a subsequent download in a manner determined based at least in part on the inferred user preference.

20 Claims, 11 Drawing Sheets

(56) References Cited

U.S. PATENT DOCUMENTS

| | | | |
|---|---|---|---|
| 2003/0074323 A1* | 4/2003 | Catan | A63F 13/77 705/59 |
| 2003/0229899 A1 | 12/2003 | Thompson | |
| 2005/0033760 A1 | 2/2005 | Fuller | |
| 2007/0186106 A1 | 8/2007 | Ting | |
| 2007/0226368 A1 | 9/2007 | Strickland | |
| 2008/0005195 A1 | 1/2008 | Li | |
| 2008/0263057 A1 | 10/2008 | Thompson | |
| 2008/0289006 A1 | 11/2008 | Hock | |
| 2009/0157802 A1 | 6/2009 | Kang | |
| 2010/0057892 A1 | 3/2010 | Han | |
| 2010/0057924 A1 | 3/2010 | Rauber | |
| 2010/0113072 A1 | 5/2010 | Gibson | |
| 2011/0137879 A1 | 6/2011 | Dubey | |
| 2011/0218963 A1 | 9/2011 | Dun | |
| 2012/0310880 A1 | 12/2012 | Giampaolo | |
| 2013/0262862 A1* | 10/2013 | Hartley | G06F 16/178 713/165 |
| 2013/0268491 A1 | 10/2013 | Chung | |
| 2014/0032759 A1 | 1/2014 | Barton | |
| 2014/0059185 A1 | 2/2014 | Siripurapu | |
| 2014/0067997 A1 | 3/2014 | Saabas | |
| 2014/0195485 A1* | 7/2014 | Dorman | G06F 16/178 707/624 |
| 2014/0287818 A1* | 9/2014 | Chan | A63F 13/77 463/24 |
| 2015/0074407 A1* | 3/2015 | Palmeri | H04L 63/0823 713/171 |
| 2015/0120662 A1 | 4/2015 | Dai | |
| 2015/0249647 A1* | 9/2015 | Mityagin | H04L 67/1095 713/168 |
| 2015/0278323 A1* | 10/2015 | Melahn | G06F 16/178 707/610 |
| 2015/0288756 A1* | 10/2015 | Larabie-Belanger | G06F 3/04842 715/753 |
| 2015/0339727 A1* | 11/2015 | Yi | G06Q 30/0246 705/14.45 |
| 2016/0088064 A1 | 3/2016 | Chen | |
| 2016/0285795 A1* | 9/2016 | Beausoleil | H04L 41/22 |
| 2016/0294916 A1* | 10/2016 | Daher | H04L 51/08 |

* cited by examiner

600

| Event # | Object | Event type | Time | Client | Event details |
|---|---|---|---|---|---|
| 1 | | | | | |
| 2 | | | | | |
| 3 | | | | | |
| 4 | | | | | |
| 5 | | | | | |
| ⋮ | | | | | |
| n | | | | | |

FIG. 6

LEARNING CLIENT PREFERENCES TO OPTIMIZE EVENT-BASED SYNCHRONIZATION

CROSS REFERENCE TO OTHER APPLICATIONS

This application is a continuation of co-pending U.S. patent application Ser. No. 14/743,339, entitled LEARNING CLIENT PREFERENCES TO OPTIMIZE EVENT-BASED SYNCHRONIZATION filed Jun. 18, 2015 which is incorporated herein by reference for all purposes.

BACKGROUND OF THE INVENTION

File sharing systems and services have been provided to maintain synchronization among a plurality of endpoints at which a synchronized folder and/or its contents (e.g., files) may be stored. Typically, synchronization has been performed via processing done primarily on the server side, enabling synchronization to be provided across disparate client devices and systems using relatively minimal client side software.

For example, in prior approaches, when an opportunity to synchronize a folder or other synchronization set as stored on a client device or system arose, e.g., the client checked in with a synchronization server, the server would determine which changes the client device or system needed to send to the server, and which changes made elsewhere needed to be downloaded to the client device or system. However, at scale, such a server centric approach may strain server side resources, particularly for large synchronization sets and/or for system that must synchronize a large number of synchronization sets of files (e.g., folders) across many client devices/systems and/or end users.

File synchronization may not always be performed in an order and/or manner that ensures that the content and/or information that is of the greatest and/or most immediate interest to a user of the endpoint device to which file system content and/or metadata is being synchronized arrives first and/or by the time the user would like to access it.

BRIEF DESCRIPTION OF THE DRAWINGS

Various embodiments of the invention are disclosed in the following detailed description and the accompanying drawings.

FIG. 6 is a block diagram illustrating an example of a data structure to store a synchronization event stream in an embodiment of a file sharing system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Machine learning of client and/or user preferences to optimize event-based file system object and/or metadata synchronization is disclosed. In various embodiments, behavioral learning techniques are used to predict programmatically events that are likely to be of the greatest and/or most immediately of interest to the client and/or user. In some embodiments, learned and/or predicted preferences are used by a synchronization server to determine an order and/or manner in which to download to the client synchronization stream events that have been requested by and/or have otherwise been determined to be required to be downloaded to the client.

Figure 1:
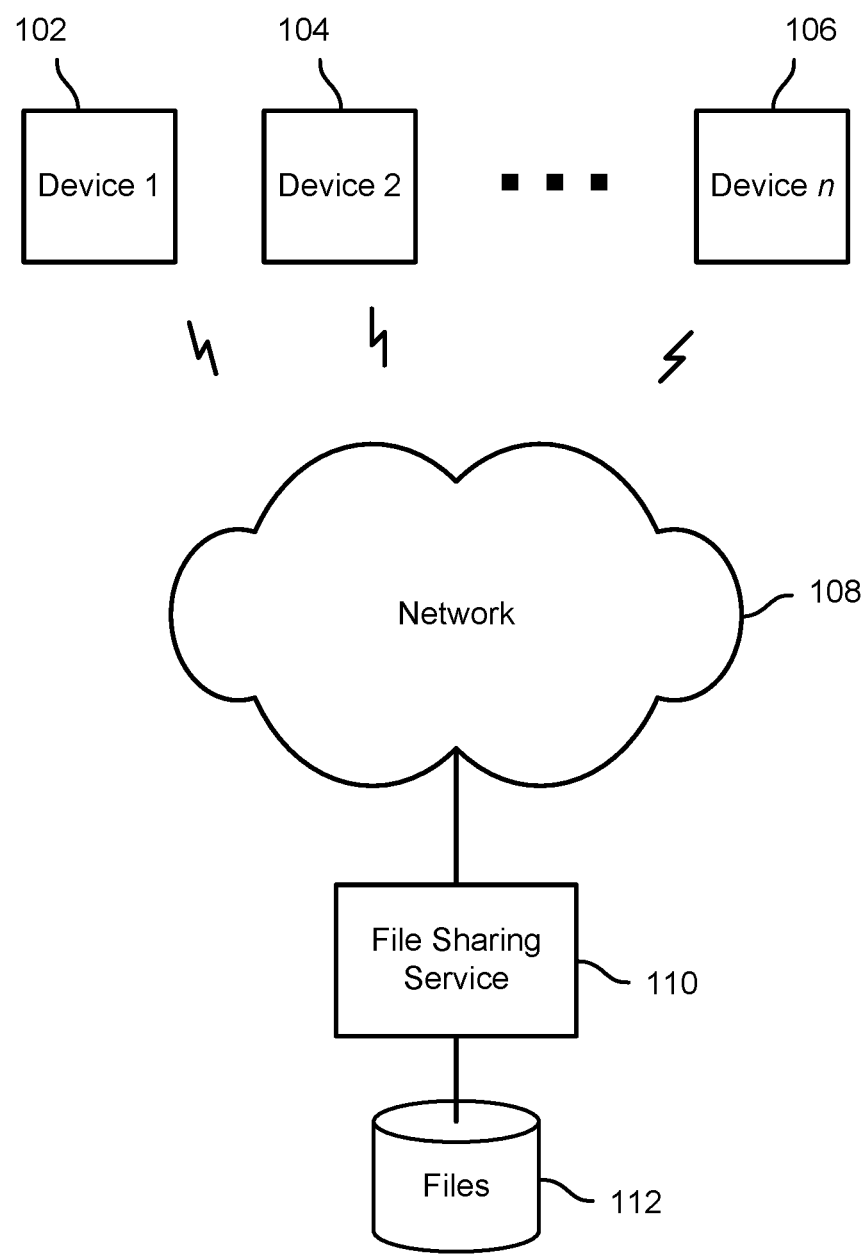
FIG. 1 is a block diagram illustrating an example embodiment of a file syncing and sharing system and associated client devices.

FIG. 1 is a block diagram illustrating an example embodiment of a file syncing and sharing system and associated client devices. In the example shown, a plurality of client devices, represented in FIG. 1 by devices 102, 104, and 106, connect via a network 108 to a file sharing service 110 configured to provide managed access, via share operations defined by users, to files stored in a file storage system and/or device 112. In some embodiments, client devices such as devices 102, 104, and 106 each have installed thereon a client application or other client side code configured to provide access to services provided by the file sharing service 110. Examples of such services may include, in various embodiments, operations to share a file and/or folder with one or more other specific users and/or groups of users, and operations to view and/or access files and folders that have been shared by other users with a user of the mobile device. In some embodiments, file sharing service 110 comprises the EMC® Syncplicity® file sharing service.

Figure 2:
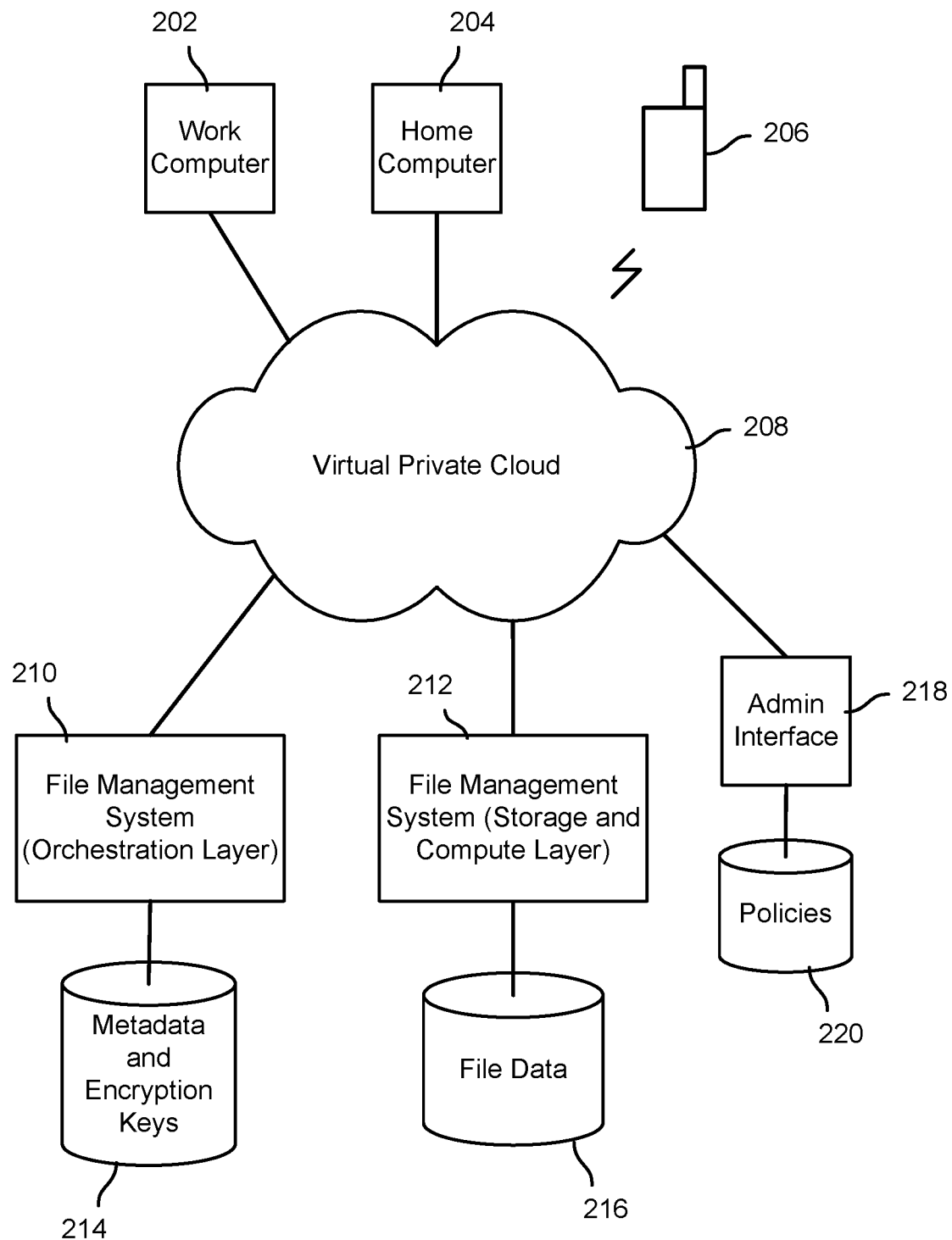
FIG. 2 is a block diagram illustrating an embodiment of a file management system.

FIG. 2 is a block diagram illustrating an embodiment of a file management system. In the example shown, content that is created, modified, deleted, etc. by one or more users of computers 102 and 104 and mobile device 106 is managed as part of a virtual private cloud 208 by a file management system that includes an orchestration layer 210 and a storage and compute layer 212. In various embodiments, a synchronization point instance may be created to manage files across disparate storage systems, including without limitation the computers 102 and 104, mobile device 106, as well as file servers and web/cloud based solutions. The orchestration layer 210 uses metadata stored and (optionally) encryption keys stored in a metadata and encryption key store 214 to manage files included in a synchronization point. Files are stored and managed "in place" at the various endpoints at which the user(s) of the synchronization point have configured them to reside. Each endpoint has a master copy of each file it is configured to store, and the locally stored file is synchronized to propagate to other endpoints changes that are made to the local copy and to update the local copy to reflect changes made at other endpoints. At file creation and/or as updates are made at various endpoints, file content data and/or changes thereto are uploaded to the storage and compute layer 212, which performs bulk data transfers and storage, and associated processing such as encryption and compression. Storage and compute layer 212 stores file data in a file data store 216, which in some embodiments may include any backend storage suitable to store large amounts of data. Using an administrative interface 218, such as a web-based interface, IT administrators can define and store in a policy store 220, and to configure the file management system to apply and enforce, file management policies, including in various embodiments and without limitation one or more of retention policies, access restrictions (e.g., restricting access to enterprise data and/or selected data depending on user/device location), security policies to limit sharing to authorized enterprise users, etc.

Figure 3:
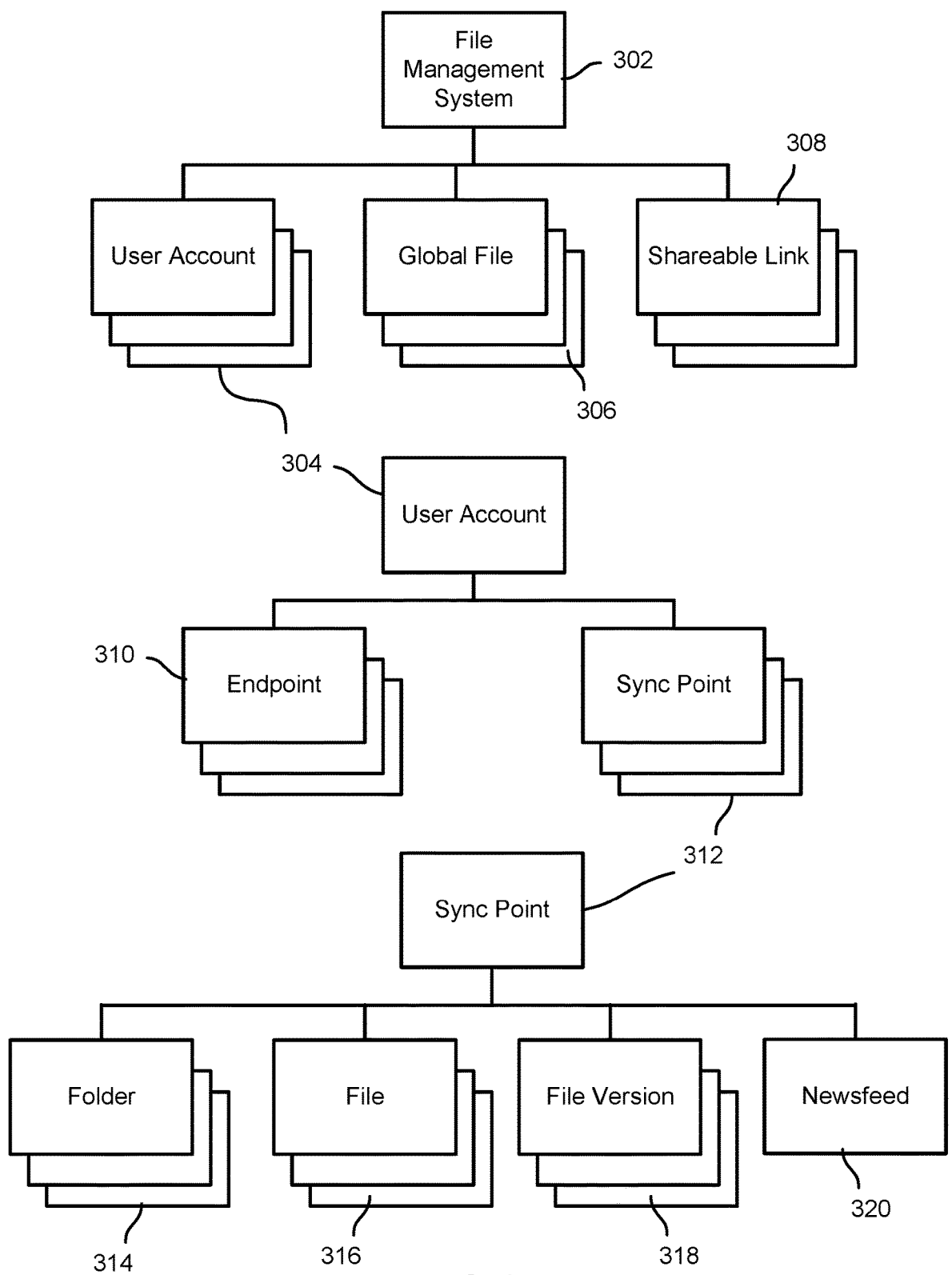
FIG. 3 is a block diagram illustrating an embodiment of a set of data structures representing entities comprising a synchronized file management system.

FIG. 3 is a block diagram illustrating an embodiment of a set of data structures representing entities comprising a synchronized file management system. In the example shown, the file management system 302 may include a plurality of user accounts 304, a plurality of global files 306, and a plurality of shareable links 308. Each user account 304 may have associated therewith one or more endpoints 310 and one or more synchronization points 312. In some embodiments, shareable lines 308 may be associated with user accounts 304. Each synchronization point 312 may include one or more folders (or subfolders) 314, a plurality of files 316, each file having one or more file versions 318, and/or a newsfeed 320 to propagate events and other information among nodes included in the synchronization point instance. In various embodiments, tables or other data structures may be created and stored to track and manage data values representing the entities shown in FIG. 3.

Event-based synchronization of objects stored in a multi-master, non-transaction file management system is disclosed. In various embodiments, a synchronization server propagates file management system object changes to endpoints associated with a synchronization point (e.g., a shared folder) with which the changed object is associated at least in part by generating and maintaining synchronization event stream. Client code running on the respective endpoints is configured to check the synchronization event stream and to use information in events comprising the stream to synchronize files, folders, and metadata as stored on the endpoint as required to become and remain synchronized with the global/authoritative state of the objects and metadata comprising the synchronization point.

Figure 4:
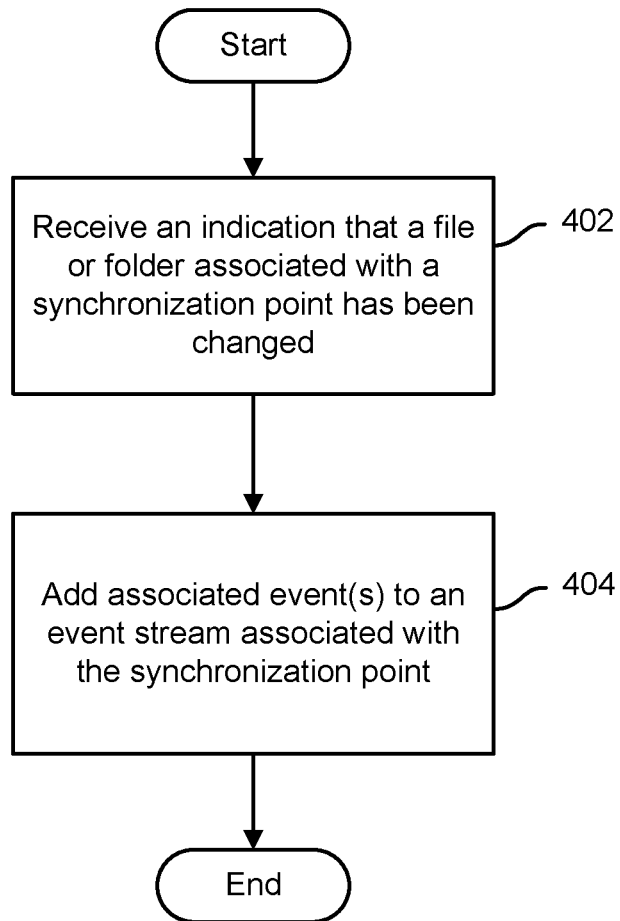
FIG. 4 is a flow chart illustrating an embodiment of a process to provide an event stream associated with a synchronization point.

FIG. 4 is a flow chart illustrating an embodiment of a process to provide an event stream associated with a synchronization point. In various embodiments, the process of FIG. 4 may be performed by a synchronization server, such as file syncing and sharing service 110 of FIG. 1 or file management system servers 210 and/or 212 of FIG. 2. In the example shown, an indication is received that a file or folder (or other object or information) associated with a synchronization point has been changed, e.g., at one of a plurality of endpoints (client systems and/or devices) associated with the synchronization point (402). For example, client code running on the endpoint may have provided the indication, e.g., in response to the object having been saved in modified form at the endpoint. A corresponding synchronization event is created and added to an event stream associated with the synchronization point (404). For example, a list, table, or other data structure may be updated to include the synchronization event. In various embodiments, synchronization events may be identified by a sequential number and/or other unique identifier, such as a monotonically increasing sequence number. In various embodiments, the event sequence numbers and/or other sequential identifiers may be used by client software to determine whether new events have been added to the event stream since that client last downloaded events, and if so which ones need to be downloaded by that client.

Figure 5:
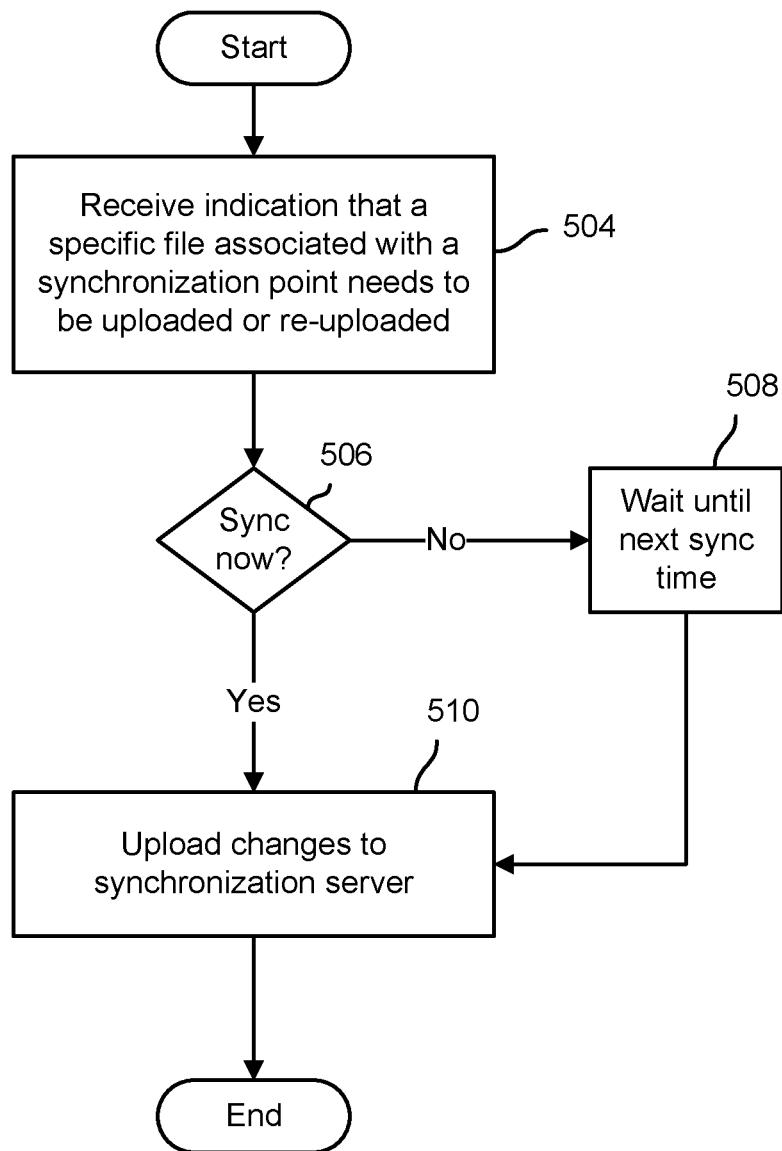
FIG. 5 is a flow chart illustrating an embodiment of a process to upload file system objects at an endpoint.

FIG. 5 is a flow chart illustrating an embodiment of a process to upload file system objects at an endpoint. In various embodiments, the process of FIG. 5 may be performed by client side code, such as a synchronization client application and/or script, running on a client system or device associated with a synchronization endpoint, such as devices 102, 104, 106 of FIG. 1 and/or clients 202, 204, 206 of FIG. 2. In some embodiments, client side execution of the process of FIG. 5 results in the indication of step 402 of FIG. 4 being received at the server side. In the example shown in FIG. 5, a server informs the client that a specific file, which is known to reside on the client device, needs to be uploaded (504). This can happen if, for example, the file was found to be corrupt on the server. If the client application/code is configured to immediately synchronize the file (506), and/or upon the next time and opportunity that the client side code is configured to synchronize files at the client (508), the files at the client are uploaded to the synchronization server (510).

FIG. 6 is a block diagram illustrating an example of a data structure to store a synchronization event stream in an embodiment of a file sharing system. In various embodiments, data structures such as the event stream table 600 of FIG. 6 may be used to store a synchronization event stream generated and maintained by a synchronization server, as in the process of FIG. 4. In the example shown, synchronization event stream table 600 includes for each sequentially numbered synchronization event in the stream a corresponding row in which the following data values are stored, each in a corresponding column of table 600: event sequence number; object (e.g., file) affected; event type (e.g., file contents modified, file/folder name changed, etc.); a time associated with the event (e.g., when the change occurred, was reported, and/or associated event was added to the stream); a client device/system/endpoint with which the event is associated (e.g., endpoint at which change was made and/or from which change was reported); and event details (e.g., name-value pairs for modified attributes, pointers to object content data as modified, etc.).

In various embodiments, a client code running on an endpoint may be configured to use data stored in synchronization event stream table 600, as stored at the synchronization server, to determine whether events have been added since a last time the client downloaded events, and if so which ones. For example, a synchronization client may query the synchronization server to determine a last used (added) event sequence number. If the number is greater than the last event sequence number processed by the client, in some embodiments the client may submit additional queries to determine which, if any, of the newly-added events should be requested for download by and to that client.

Figure 7:
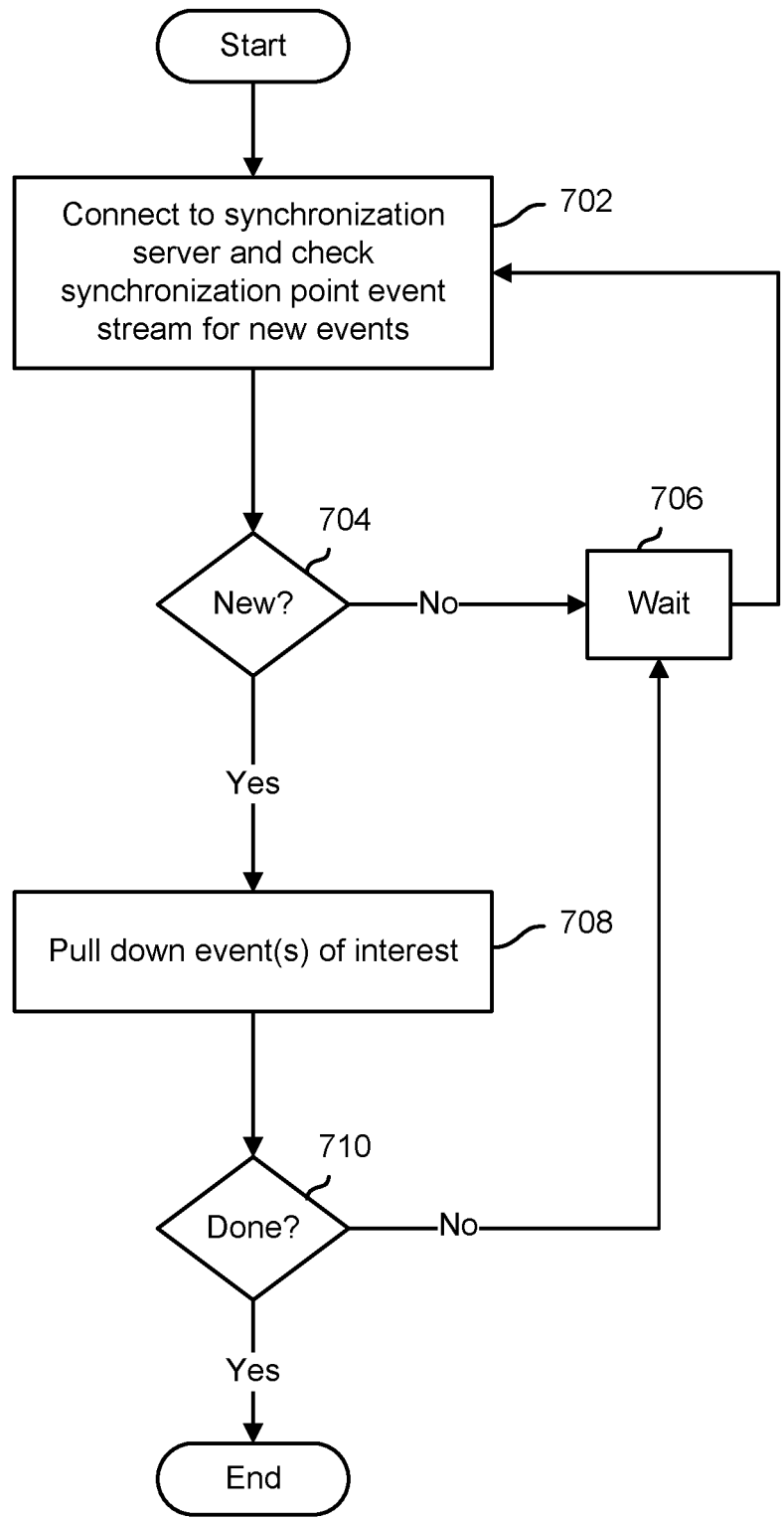
FIG. 7 is a flow chart illustrating an embodiment of a process to download synchronization events to an endpoint.

FIG. 7 is a flow chart illustrating an embodiment of a process to download synchronization events to an endpoint. In various embodiments, a synchronization client application or other client side synchronization code may be configured to perform the process of FIG. 7, e.g., client code running on client systems and/or devices, such as devices 102, 104, 106 of FIG. 1 and/or clients 202, 204, 206 of FIG. 2. In the example shown, the client side code connects to the synchronization server and checks to determine if the synchronization event stream associated with a synchronization point with respect to which the client is a participating endpoint includes any synchronization events that were added since a last time the client checked for and/or downloaded events in the stream (702). If there are no new events (704), the client waits a prescribed interval (e.g., admin user configurable, hard coded, dynamically determined based on conditions, location, etc.) (706) and checks again (702). If there are events in the synchronization event stream that the client has not yet downloaded (704), the client identifies and pulls down (e.g., requests from the server) events of interest to that client (708). For example, the client may request only a subset of events relating to synchronization point objects with respect to which the client has been configured to maintain synchronization. Once new events have been downloaded (710), the client will wait a prescribed interval and/or for occurrence of a prescribed event (706) before checking again (702). The process continues until done (710), e.g., the client is no longer an endpoint participating in the synchronization point.

Techniques to learn client and/or user preferences to optimize event-based synchronization of file management system objects (e.g., files, folders) and/or metadata are disclosed.

Figure 8:
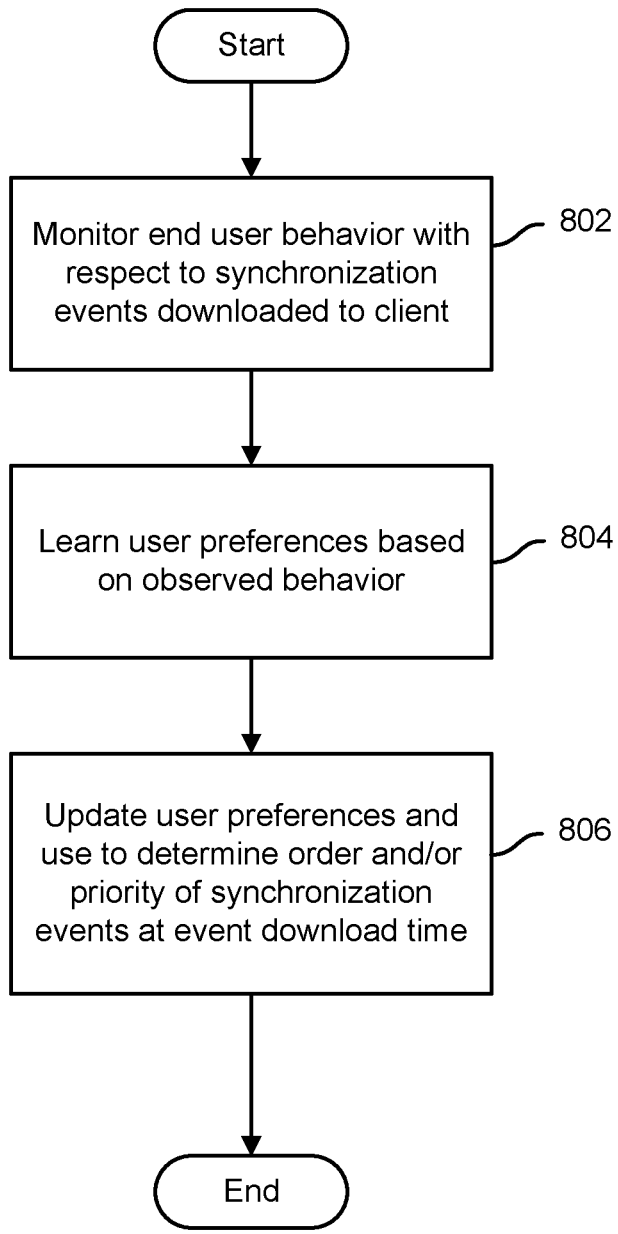
FIG. 8 is a flow chart illustrating an embodiment of a process to learn user preferences in the context of a synchronization event stream-based file management system.

FIG. 8 is a flow chart illustrating an embodiment of a process to learn user preferences in the context of a synchronization event stream-based file management system. In various embodiments, the process of FIG. 8 may be performed by a synchronization server, such as file sharing service 110 of FIG. 1 or file management system servers 210 and/or 212 of FIG. 2. In some embodiments, the process of FIG. 8 may be performed by a client system or device associated with a synchronization endpoint, such as devices 102, 104, 106 of FIG. 1 and/or clients 202, 204, 206 of FIG. 2. In the example shown, end user behavior (e.g., interaction with) with respect to synchronization events and/or data that has been downloaded to a given client is observed (802). For example, a time-to-first access of the data at the client may be recorded and/or reported to the synchronization server. Machine (e.g., behavioral) learning techniques are used to determine and/or predict the associated user's preferences with respect to the synchronization point and/or synchronization (e.g., change) data associated therewith (804). For example, the system may observe with objects within the synchronization set and/or objects or metadata of which type appears to be of the greatest and/or most immediate interest to the user. The system may base such a conclusion on the observation that changes associated with objects of a particular type (e.g., spreadsheets), objects in (e.g., that have been added to) a particular folder, objects associated with a particular author or owner, and/or changes made by a particular other user (e.g., the user's boss) typically are access by the user before (and/or to the exclusion of) other changes and/or are accessed within a relatively short amount of time after download. Stored client and/or user preferences, such as a user profile, are updated based on the learned and/or predicted preferences, and are used at event download time to prioritize, determine the order of, and/or otherwise determine the manner in which subsequent synchronization events are downloaded to the client (806).

In various embodiments, machine learning techniques and/or context data may be used as disclosed herein by one or both of a synchronization client and a synchronization server to reorder the events or decide on actions such as which files to download first. In some embodiments, for example, a synchronization client may by itself use machine learning techniques and/or context information to decide what files to download. For example if client has visibility into a calendar application, such as Microsoft Outlook® and can see that the user is attending a meeting with a set of participants or a meeting organized by another user, the synchronization client in some embodiments may use this information to prioritize download of files recently updated by the meeting participants or the organizer.

Figure 9:
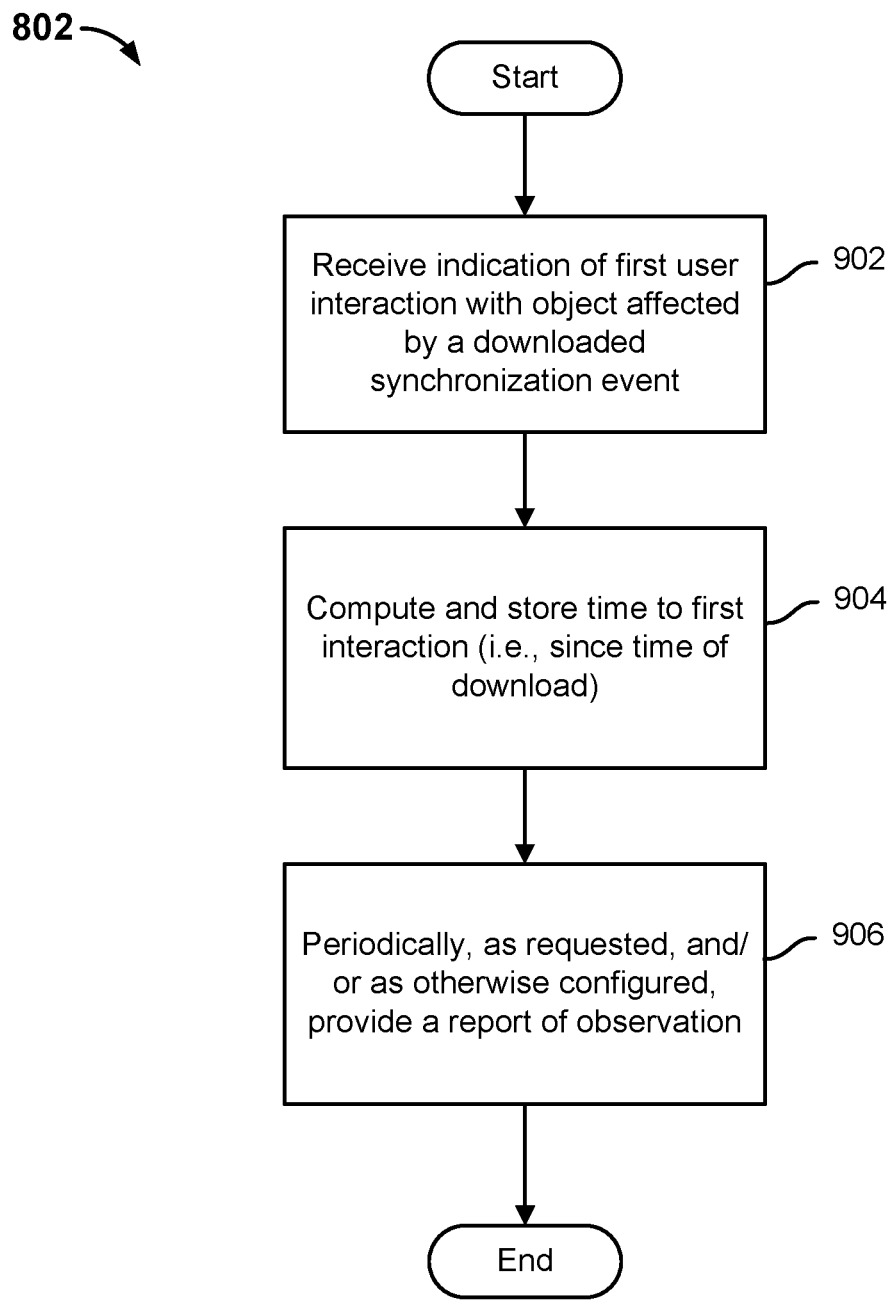
FIG. 9 is a flow chart illustrating an embodiment of a process to observation client interactions with downloaded synchronization events.

FIG. 9 is a flow chart illustrating an embodiment of a process to observation client interactions with downloaded synchronization events. In various embodiments, a synchronization client application or other client side synchronization code may be configured to perform the process of FIG. 9, e.g., client code running on client systems and/or devices, such as devices 102, 104, 106 of FIG. 1 and/or clients 202, 204, 206 of FIG. 2. In various embodiments, the process of FIG. 9 may be included in and/or otherwise associated with step 802 of the process of FIG. 8. In the example shown, an indication is received that a first user interaction with an object affected by a downloaded synchronization event, e.g., opening the object, reading metadata attributes, etc., has occurred (902). An amount of time that elapsed from a time the event was downloaded to the client until the time of the first observed interaction is computed and stored, e.g., in a table or other data structure (904). Periodically, as requested, in response to events, opportunistically, and/or otherwise as configured, in various embodiments, a report of observations regarding the time that elapsed between event download and first client/user interaction with an affected object or information for each of one or more events is reported, e.g., packaged and sent to a synchronization server (906).

Figure 10:
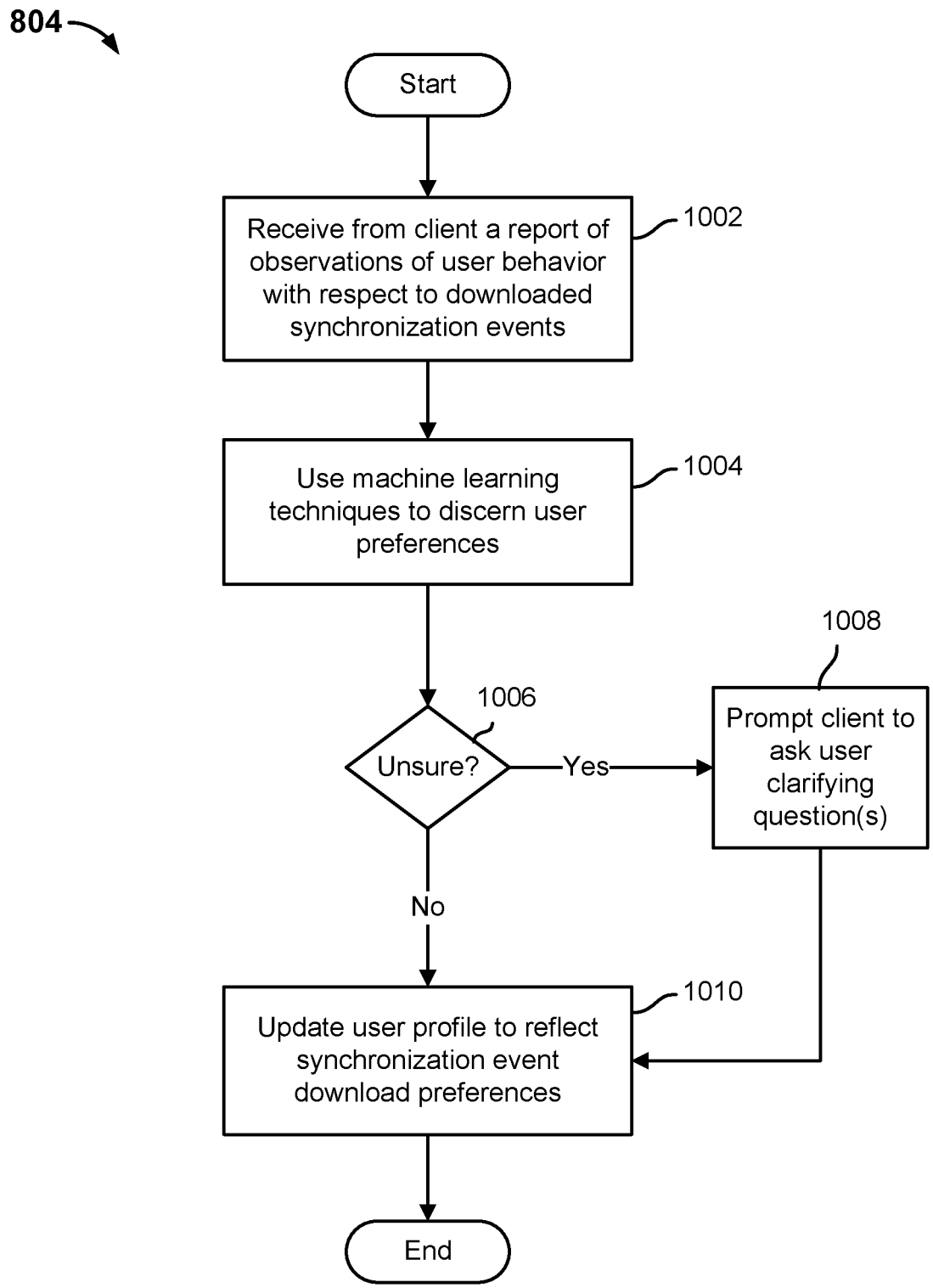
FIG. 10 is a flow chart illustrating an embodiment of a process to learn client and/or user preferences based on observed interactions with downloaded synchronization events.

FIG. 10 is a flow chart illustrating an embodiment of a process to learn client and/or user preferences based on observed interactions with downloaded synchronization events. In various embodiments, the process of FIG. 10 may be performed by a synchronization server, such as file sharing service 110 of FIG. 1 or file management system servers 210 and/or 212 of FIG. 2. In various embodiments, the process of FIG. 10 may be included in and/or otherwise associated with step 804 of the process of FIG. 8. In the example shown, a report of observations of user behavior with respect to downloaded synchronization events is received, e.g., from a synchronization client, such as one configured to perform the process of FIG. 9 (1002). Machine learning techniques are used to learn, based on the reported observations, one or more client/user preferences with respect to downloaded synchronization events associated with a synchronization point with which the received observations were associated (1004). In some embodiments, user behavior over time is observed and used to build a model of user behavior. The model may be used to predict or otherwise discern one or more user preferences with respect to the download and/or availability of synchronization data.

If a preference is discerned but with a level of confidence that is lower than a prescribed and/or configured threshold (1006), the client application or other client side code installed on the client device/system that made the report (1002) may be prompted to ask the user a clarifying and/or confirming question (1008). For example, if a user has been observed to open a first subfolder immediately upon synchronization but the system is not sufficient sure the user would always want synchronization events associated with that subfolder to be downloaded first, the synchronization server may prompt the client to pose a question such as, "You seem to open subfolder A first after synchronization, should we prioritize the download of events (or other change data) affecting that subfolder?" Or, in another example the user may have been observed to have frequently opened first changed files that were last modified by a given user (e.g., "Fred Jones", who may be the user's boss, close colleague, etc.), in which case if the system were not sufficiently sure of the user's preference the synchronization server may prompt the client application or other client code to pose to the user the question, "Do you want files last modified by Fred Jones to always be downloaded first?"

Once clarifying questions have been asked and answered (1008), or if the system has determined learned preferences with sufficient certainty without asking such questions (1006), the user's profile is updated to reflect the learned synchronization event download preferences (1010).

Figure 11:
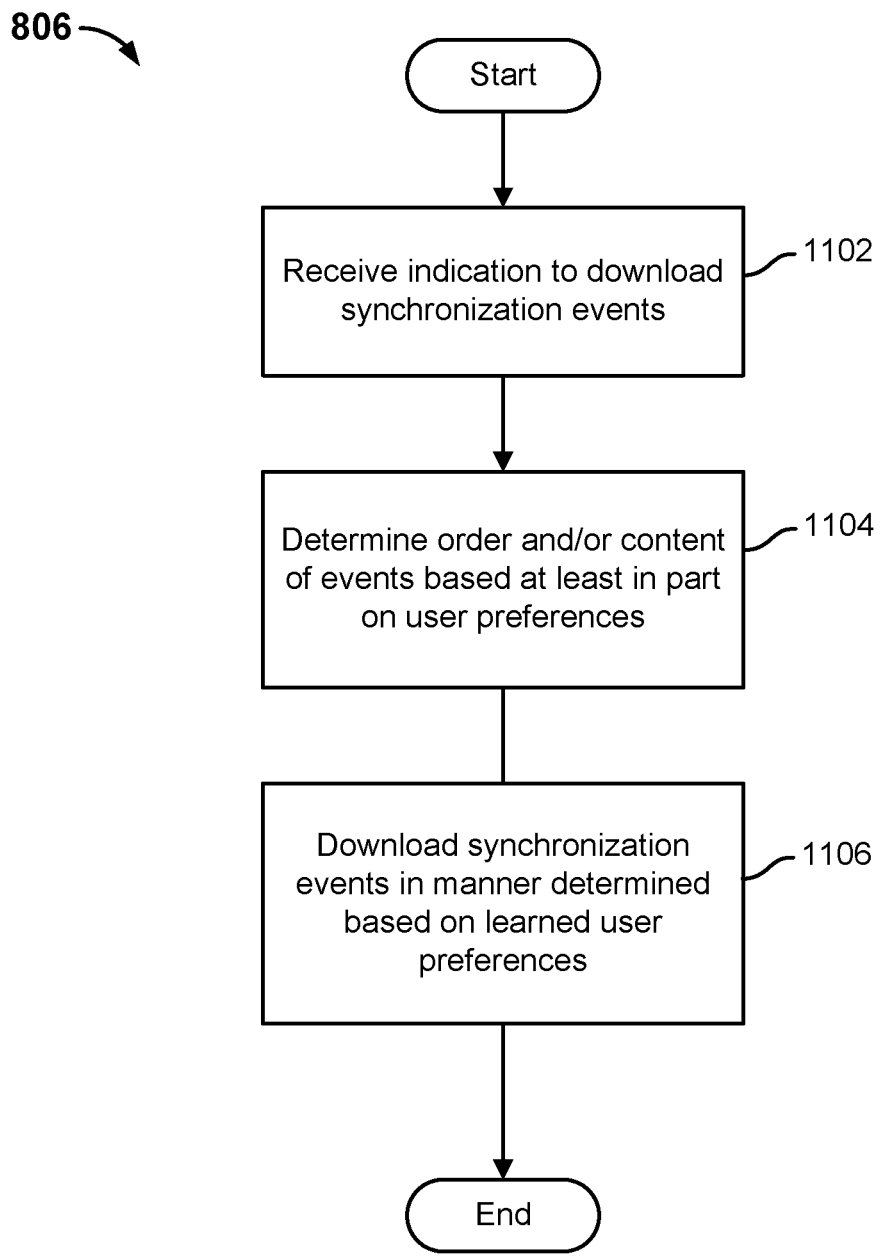
FIG. 11 is a flow chart illustrating an embodiment of a process to download synchronization events in an order and/or manner determined based at least in part on learned client and/or user preferences.

FIG. 11 is a flow chart illustrating an embodiment of a process to download synchronization events in an order and/or manner determined based at least in part on learned client and/or user preferences. In various embodiments, the process of FIG. 11 may be performed by a synchronization server, such as file sharing service 110 of FIG. 1 or file management system servers 210 and/or 212 of FIG. 2. In various embodiments, the process of FIG. 11 may be included in and/or otherwise associated with step 806 of the process of FIG. 8. In the example shown, an indication is received to download synchronization events to a synchronization client, such as a client application running on a client device/system that is an endpoint with respect to a synchronization folder/set (1102). In some embodiments, the client may be configured to check, e.g., periodically, to determine whether new events have been added to a synchronization event stream associated with a synchronization point, and if so to request the download of at least some such events. An order and/or content of events and/or event data is determined, e.g., by the synchronization server, based at least in part on previously-learned client/user preferences (1104). For example, events associated with objects (e.g., files, folders) that are associated with particular sub-folder, author, owner, user last modified by, etc. may be identified to be downloaded first. Synchronization events are downloaded to the client in the manner that was determined based at least in part on learned client/user preferences (1106).

In various embodiments, learning client preferences to optimize event-based synchronizations, as disclosed herein, may help to ensure that the changes a user is most likely to be interested in accessing is downloaded to the client first.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
obtaining, by one or more processors associated with a terminal that communicates with a synchronization server, a synchronization event stream, the synchronization event stream being provided by the synchronization server, the synchronization event stream comprising one or more synchronization events that are associated with one or more corresponding event sequence identifiers identifying the one or more synchronization events, and the one or more synchronization events corresponding to changes to file management system objects synchronized across a plurality of endpoints, wherein the synchronization event stream further includes an indication of an event type corresponding to the one or more synchronization events, time associated with the one or more synchronization events, and node change of the one or more synchronization events;
determining, by the one or more processors, to synchronize one or more objects of a synchronization set data based on the event type corresponding to the one or more synchronization events comprised in the synchronization event stream, the one or more corresponding event sequence identifiers, and an inferred user preference with respect to the synchronization set data for the one or more objects that are subject to synchronization between the terminal and the synchronization server; and
providing, by the one or more processors, to a user of the terminal access to subsequently downloaded portions of data associated with the one or more objects determined to be synchronized, wherein a user account associated with the terminal access is associated with the plurality of endpoints and a set of synchronization points.

2. The method of claim 1, wherein the inferred user preference is determined based on a user interaction with respect to the synchronization set data that has been synchronized between the terminal and the synchronization server.

3. The method of claim 2, wherein the terminal is configured to report observed interactions to the synchronization server, and the observed interactions are used in connection with determining the inferred user preference.

4. The method of claim 3, wherein the observed user interaction relates to one or more attributes of synchronization set objects with which a user interacted with subsequent to synchronization.

5. The method of claim 3, wherein the observed user interaction relates to an amount of time that elapsed between synchronization of an object and a user's first interaction with that object after synchronization.

6. The method of claim 1, wherein the inferred user preference is stored in a user profile.

7. The method of claim 1, wherein the access to the subsequently downloaded portions of data associated with the one or more objects determined to be synchronized is provided in a manner determined based on the inferred user preference, including giving greater priority to downloading changes associated with an object in which a user is predicted to have interest based on the inferred user preference.

8. The method of claim 1, further comprising:
identifying events of interest from the synchronization event stream; and
receiving a request, from a synchronization client, for the identified events of interest.

9. The method of claim 1, further comprising:
receiving, from one or more synchronization clients of a plurality of synchronization clients of the plurality of endpoints, one or more indications that an object in the synchronization set data has been modified;
in response to receiving the one or more indications that the object in the synchronization set data has been modified, updating the synchronization event stream based on the one or more indications that the object in the synchronization set data has been modified; and
communicating the synchronization event stream to at least one of the plurality of endpoints.

10. The method of claim 1, wherein the synchronization event stream is associated with a synchronization point and comprises synchronization events associated with a plurality of objects stored based on information provided by a plurality of synchronization clients for which the synchronization point provides synchronization.

11. The method of claim 1, wherein the synchronization event stream provides notice of changes to the synchronization set data.

12. The method of claim 1, wherein the one or more objects determined to be synchronized corresponds to a subset of all synchronization events added to the synchronization event stream since the terminal last performed a synchronization with respect to the synchronization event stream.

13. A system, comprising:
a memory or other storage device; and
a processor coupled to the memory or the other storage device, the processor associated with a terminal that communicates with a synchronization server, and the processor configured to:
obtain a synchronization event stream, the synchronization event stream being provided by the synchronization server, the synchronization event stream comprising one or more synchronization events that are associated with one or more corresponding event sequence identifiers identifying the one or more synchronization events, and the one or more synchronization events corresponding to changes to file management system objects synchronized across a plurality of endpoints, wherein the synchronization event stream further includes an indication of an event type corresponding to the one or more synchronization events, time associated with the one or more synchronization events, and node change of the one or more synchronization events;
determine to synchronize one or more objects of a synchronization set data based on the event type corresponding to the one or more synchronization events comprised in the synchronization event stream, the one or more corresponding event sequence identifiers, and an inferred user preference with respect to the synchronization set data for the one or more objects that are subject to synchronization between the terminal and the synchronization server; and
provide to a user of the terminal access to subsequently downloaded portions of data associated with the one or more objects determined to be synchronized, wherein a user account associated with the terminal access is associated with the plurality of endpoints and a set of synchronization points.

14. The system of claim 13, wherein the inferred user preference is determined based on a user interaction with respect to the synchronization set data that has been synchronized between the terminal and the synchronization server.

15. The system of claim 14, wherein the terminal is configured to report observed interactions to the synchronization server, and the observed interactions are used in connection with determining the inferred user preference.

16. The system of claim 15, wherein the observed user interaction relates to one or more attributes of synchronization set objects with which a user interacted with subsequent to synchronization.

17. The system of claim 15, wherein the observed user interaction relates to an amount of time that elapsed between synchronization of an object and a user's first interaction with that object after synchronization.

18. The system of claim 13, wherein the inferred user preference is stored in a user profile.

19. The system of claim 13, wherein the access to the subsequently downloaded portions of data associated with the one or more objects determined to be synchronized is provided in a manner determined based on the inferred user preference, including giving greater priority to downloading changes associated with an object in which a user is predicted to have interest based on the inferred user preference.

20. A computer program product, the computer program product being embodied in a non-transitory computer readable storage medium and comprising computer instructions for:
obtaining, by one or more processors associated with a terminal that communicates with a synchronization server, a synchronization event stream, the synchronization event stream being provided by the synchronization server, the synchronization event stream comprising one or more synchronization events that are associated with one or more corresponding event sequence identifiers identifying the one or more synchronization events, and the one or more synchronization events corresponding to changes to file management system objects synchronized across a plurality of endpoints, wherein the synchronization event stream further includes an indication of an event type corresponding to the one or more synchronization events, time associated with the one or more synchronization events, and node change of the one or more synchronization events;
determining, by one or more processors, to synchronize one or more objects of a synchronization set data based on the event type corresponding to the one or more synchronization events comprised in the synchronization event stream, the one or more corresponding event sequence identifiers, and an inferred user preference with respect to the synchronization set data for the one or more objects that are subject to synchronization between the terminal and the synchronization server; and providing, by one or more processors, to a user of the terminal access to subsequently downloaded portions of data associated with the one or more objects determined to be synchronized, wherein a user account associated with the terminal access is associated with the plurality of endpoints and a set of synchronization points.

\* \* \* \* \*